US012750446B2

(12) United States Patent
Piscopo, Jr.

(10) Patent No.: US 12,750,446 B2
(45) Date of Patent: Sep. 29, 2026

(54) SCAM CALL AUDIO SCREENING AND WARNING CONFIGURATION

(71) Applicant: FIRST ORION CORP., North Little Rock, AR (US)

(72) Inventor: Robert Francis Piscopo, Jr., Saint Petersburg, FL (US)

(73) Assignee: FIRST ORION CORP., North Little Rock, AR (US)

( * ) Notice: Subject to any disclaimer, the term of this patent is extended or adjusted under 35 U.S.C. 154(b) by 129 days.

(21) Appl. No.: 18/669,476

(22) Filed: May 20, 2024

(65) Prior Publication Data

US 2025/0358364 A1 Nov. 20, 2025

(51) Int. Cl.
*H04M 3/436* (2006.01)
*H04M 3/42* (2006.01)

(52) U.S. Cl.
CPC ....... *H04M 3/436* (2013.01); *H04M 3/42042* (2013.01)

(58) Field of Classification Search
CPC ............. H04M 3/436; H04M 3/42042; H04M 3/2281; H04M 3/2218; H04M 3/2209; H04M 3/42; H04M 1/56; H04M 15/06
See application file for complete search history.

(56) References Cited

U.S. PATENT DOCUMENTS

| | | | | |
|---|---|---|---|---|
| 10,659,605 | B1 | 5/2020 | Braundmeier et al. | |
| 2010/0284288 | A1* | 11/2010 | Lee | H04L 63/1416 370/252 |
| 2017/0353491 | A1 | 12/2017 | Gukal et al. | |
| 2019/0149665 | A1* | 5/2019 | Morishita | H04M 15/8353 379/189 |
| 2023/0008822 | A1* | 1/2023 | Serban | G06N 3/08 |
| 2023/0044205 | A1 | 2/2023 | Nag | |
| 2023/0095897 | A1 | 3/2023 | Endo | |

OTHER PUBLICATIONS

International Search Report issued in the International Application No. PCT/US2025/030155, mailed on Jul. 21, 2025.

* cited by examiner

*Primary Examiner* — Yosef K Laekemariam

(57) ABSTRACT

An example provides call processing by receiving a call invite message associated with a call intended for a call device, identifying one or more audio portions of the call, creating one or more audio packets to include a warning audio message, and forwarding the created one or more audio packets to the intended call device.

20 Claims, 6 Drawing Sheets

SCAM CALL AUDIO SCREENING AND WARNING CONFIGURATION

BACKGROUND

Conventionally, caller identification (ID) spoofing refers to the practice of manipulating the information displayed on a recipient device caller ID display to make it appear as if the call is originating from a different phone number or entity than the entity that is actually performing the call. This scam technique is commonly used by scammers and fraudsters to deceive and defraud unsuspecting individuals to trick call recipients into believing they are receiving a call from a known or trusted party.

Caller ID spoofing provides scammers with the capability to mask their true identity and make their calls appear legitimate. By manipulating the caller information displayed on the recipient's call device, scammers can make it seem like the call is coming from a trusted source, such as a government agency, financial institution, or well-known company. With this deceptive tactic, scammers can execute various fraudulent schemes. They might impersonate bank representatives, claiming there is an urgent issue with the recipient's account and tricking them into revealing sensitive personal information, such as passwords, account numbers, or social security numbers. Alternatively, scammers might pose as technical support agents, warning individuals of non-existent computer issues and convincing them to grant remote access to their devices, enabling the scammers to install malware or steal valuable data.

STIR/SHAKEN (secure telephone identity revisited/signature-based handling of asserted information using tokens) is a framework designed to combat caller ID spoofing and restore trust in phone call identification systems. The system works by implementing digital certificates and cryptographic signatures that enable service providers to verify the authenticity of caller ID information. When a call is made, the originating service provider signs the call with a digital certificate, indicating that the caller ID information has been validated. The call then passes through the network, and the recipient's service provider can verify the signature and ensure that the Caller ID information is legitimate.

By implementing STIR/SHAKEN, legitimate service providers can distinguish between legitimate calls and those with spoofed caller ID information, making it more difficult for scammers to deceive unsuspecting individuals. This technology helps restore confidence in caller ID systems, enhancing call authentication and enabling individuals to make more informed decisions when answering or trusting incoming calls.

While STIR/SHAKEN is an effective framework for combating caller ID spoofing, there are certain cases where signing cannot be performed or where the signature may not reach the terminating service provider (TSP). These situations include calls originating from international networks that do not support STIR/SHAKEN implementation or calls made between service providers that have not yet adopted the framework. Additionally, calls that pass through intermediate networks or undergo complex call routing processes may encounter challenges in transmitting the signature to the TSP.

Additional scam call prevention efforts have been identified to reduce the likelihood of connecting calls to end users without at least notifying them of the risks of a particular caller. Artificial intelligence and machine learning algorithms are expanding the field of call processing and call filtering to reduce the number of unwanted calls reaching an end user on their mobile device. At least a warning should be provided for any call that is suspicious or which meets the criteria of a likely undesired automated call or scam type of call.

SUMMARY

Example embodiments of the present application provide at least a method that includes at least one of receiving and processing a call to identify audio attributes of the call.

One example may include a process that includes one or more of receiving a call invite message associated with a call intended for a call device, identifying one or more audio portions of the call, creating one or more audio packets to include a warning audio message, and forwarding the created one or more audio packets to the intended call device.

Another example embodiment may include an apparatus that includes a receiver configured to receive a call invite message associated with a call intended for a call device, a processor configured to identify one or more audio portions of the call, create one or more audio packets to include a warning audio message, and forward the created one or more audio packets to the intended call device.

A non-transitory computer readable storage medium configured to store instructions that include receiving a call invite message associated with a call intended for a call device, identifying one or more audio portions of the call, creating one or more audio packets to include a warning audio message, and forwarding the created one or more audio packets to the intended call device.

DETAILED DESCRIPTION

Figure 1:
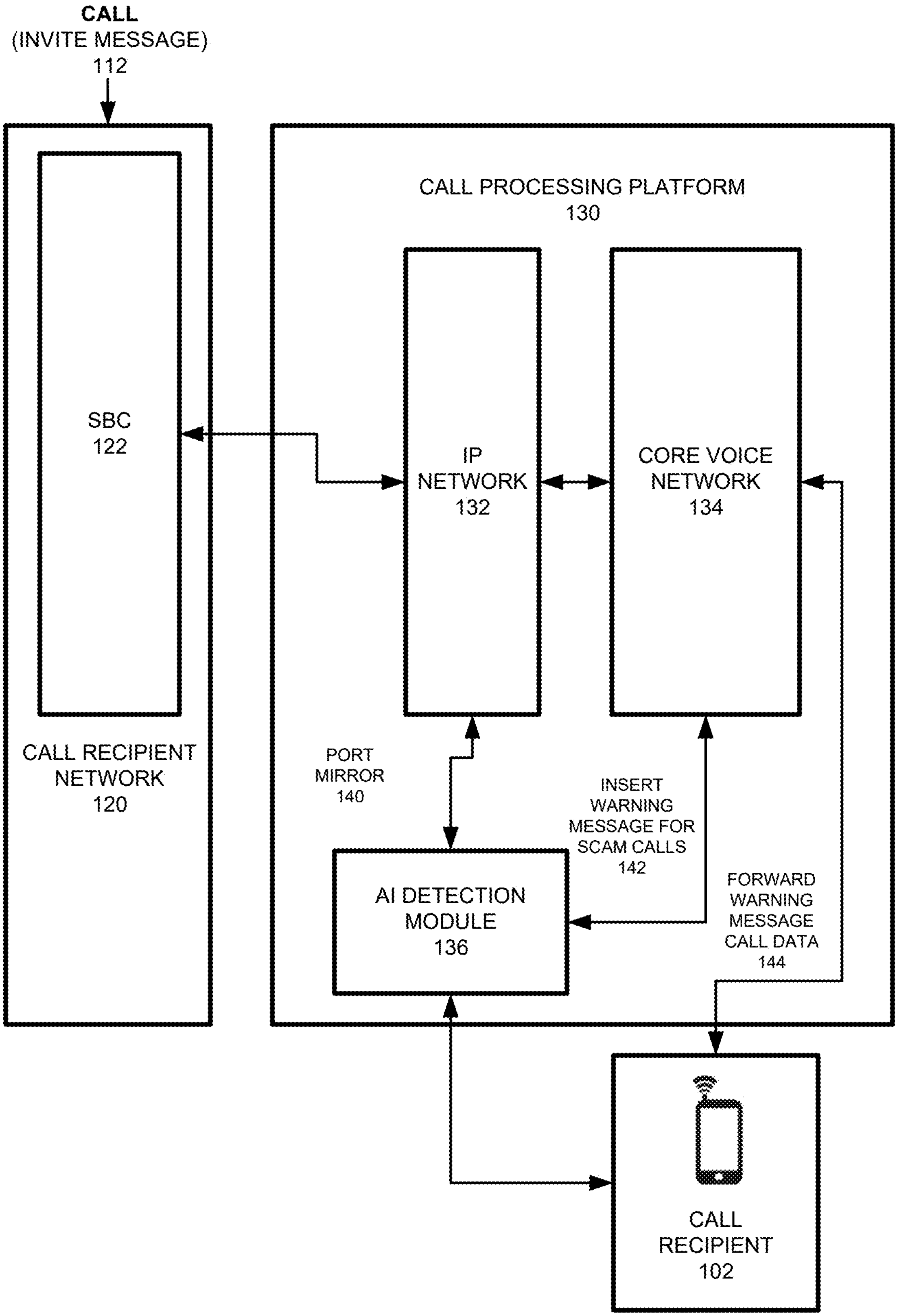
FIG. 1 illustrates a call network configuration including a call processing entity for identifying and attempting to warn an end user device about a likelihood of a scam call according to example embodiments.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

As calls are received by an edge network device, such as a call processing router or other data processing device, the calls may be identified by certain call related protocols, such as session initiation protocol (SIP) and related signaling information, such as a SIP INVITE message being received with call recipient information identified as part of a destination address field of one or more packets. A call may invoke a real time protocol (RTP) session. The RTP session can be mirrored and monitored for suspicious call information. Any voice audio or related audio may be pre-processed to identify suspicious call attributes based on known call attributes stored in memory. Certain voice audio may be stored in a database as reference information that can be compared to incoming voice information for identification of suspicious robocalls, marketing calls, etc.

A packet level analysis may be performed to determine whether one or more audio packets in a sequence include information that is suspicious as a potential scam call. As a jitter buffer is loading call data, a portion of the audio stream of the call may be played to identify audio characteristic of the audio stream, such as to determine whether the audio is prerecorded or known to the audio data stored in the call monitoring system. When a call stream is identified as potentially an automated call, scam or fraudulent, etc., one or more call related packets can be modified by the call processing system to include an audio indictor, such as a known audio sound, a small spoken recording "this is likely scam", etc. The RTP packets being transmitted are readable in their entireties. The information, such as the source and destination IP addresses, ports, sequence numbers, etc., can be used to spoof/insert RTP packets that contain a warning audio payload that is used to warn the called party into the ongoing audio stream. The RTP packet(s) that is/are inserted can be a different packet that is not part of the original audio stream, but which is accepted as if it were part of the existing stream by the end device receiving the RTP packets.

FIG. 1 illustrates a call network configuration including a call processing entity for identifying and attempting to warn an end user device about the likelihood of a scam call according to example embodiments. Referring to FIG. 1, the example network configuration includes a call recipient network device 120, such as an edge router or other device. A session border controller (SBC) 122 may receive a call signal, such as a SIP INVITE 112. The call data may be forwarded to a call processing platform 130. Any call may be identified as one or more categories, such as a suspect call or new call not previously recognized, such as a new telephone number and/or IP address or other data network indicator that is considered new data which is not previously identified. A scam call which is identified as being a likely scam call and a normal call which is identified as being a regular call not a scam call based on known information.

In operation, the calls are received at a receiving platform of an IP network 132 and as the call is identified, any suspect calls (new) and/or potential scam calls (based on one or more portions of known data) may have their data mirrored by a port mirror 140 which provides the call data to an AI based screening module 136. The call data may be decoded to identify sections of audio which can be analyzed during a buffering operation and after the call is connected with the call recipient 102. The decoded data can be encoded to include an audio message, such as a warning message to be played on the user device 102.

The packet data may also be modified to include a sequence number modification to ensure the packet is identified by the end user device 102 as a next packet to be received, examined and/or played. When the AI function of the call screening module 134 identifies audio that is likely a scam based on one or more scam identification criteria, the packet(s) may have a warning message inserted to warn about the potential of a scam call 142. During the call time period, the warning message 144 (one or more packets modified to include the warning data), may be forwarded to the end user device 102.

In this example of the active call receiving a warning message, the call may be connected and audio may be provided to the called device 102. The audio may be a live agent or a recorded audio segment depending on the call originator. However, during the call, the intended call data packets for the recipient device may be mirrored and intercepted to screen and identify potential scam calls. Once the detection module 136 labels the call a scam, additional packets may be created or mirrored packets may be recycled and modified to include additional audio data, such as a warning message "this is likely a scam call". The modified packets may have their audio data modified, their sequence number modified, etc., among other packet parameters known to those skilled in the art. The modified packets are injected into the stream of buffered packets intended for the called entity as well as the packets originally intended and sent to the called device by the call origination device.

Figure 2A:
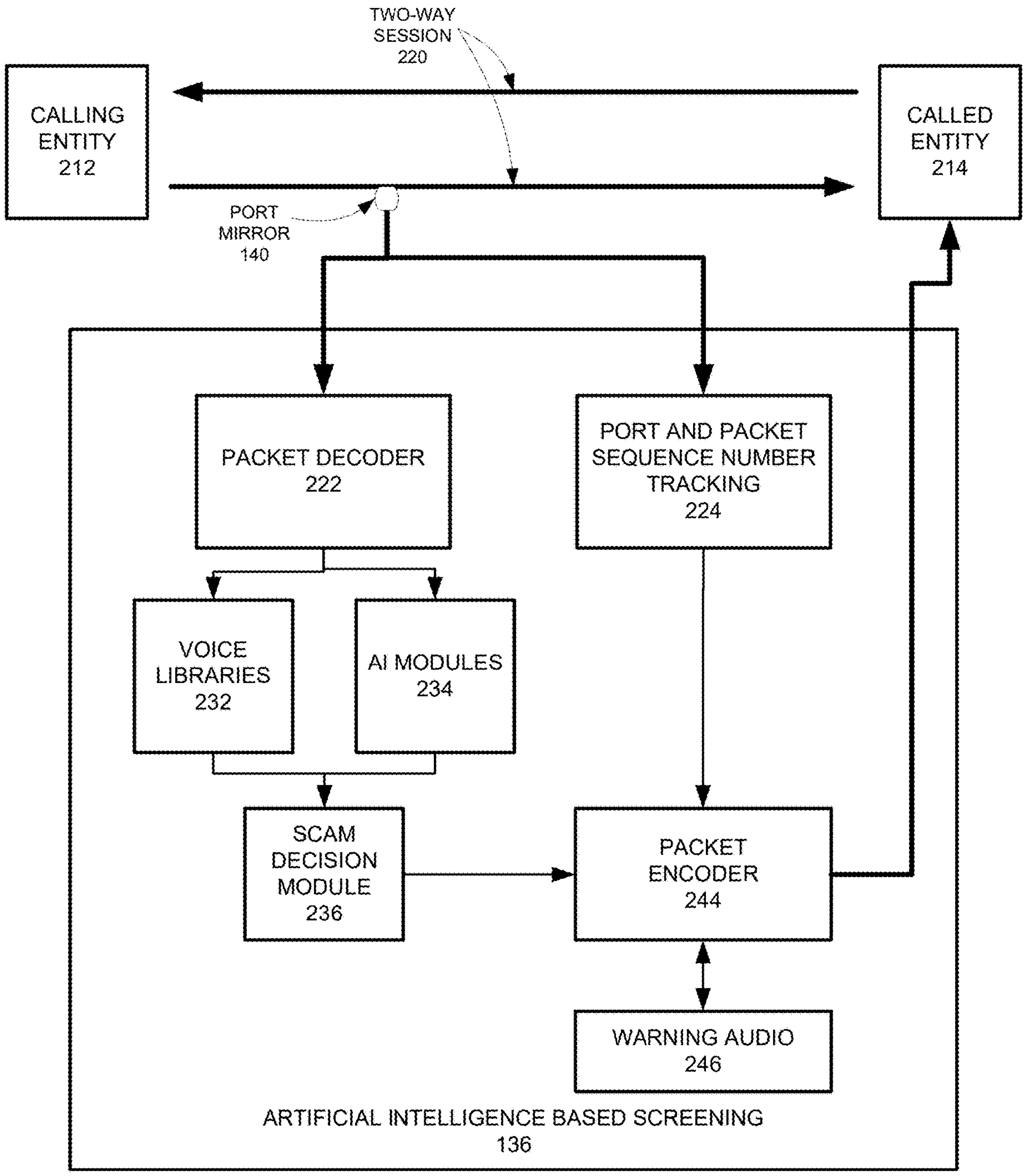
FIG. 2A illustrates a system configuration of an artificial intelligence call audio processing module according to example embodiments.

FIG. 2A illustrates a system configuration of an artificial intelligence call audio processing module according to example embodiments. Referring to FIG. 2A, the detection module 136 is described in further detail. The call session may be a two-way session 220 where the calling connection is mirrored via a port mirror 140. The data may be identified by a packet decoder 222 and a port and sequence number tracking module 224. The voice libraries of known audio data 232 and AI modules 234 may assist with identifying whether the audio of the packet(s) is a scam or just a regular unsuspected call. A decision may be made and sent via a decision module 236 to the packet encoder 244 which may have a packet manipulation process being performed where the modified packet that is to be injected into the call stream may include a warning message. The warning audio 246 is inserted into the modified packet which is sent to the called entity 214.

Figure 2B:
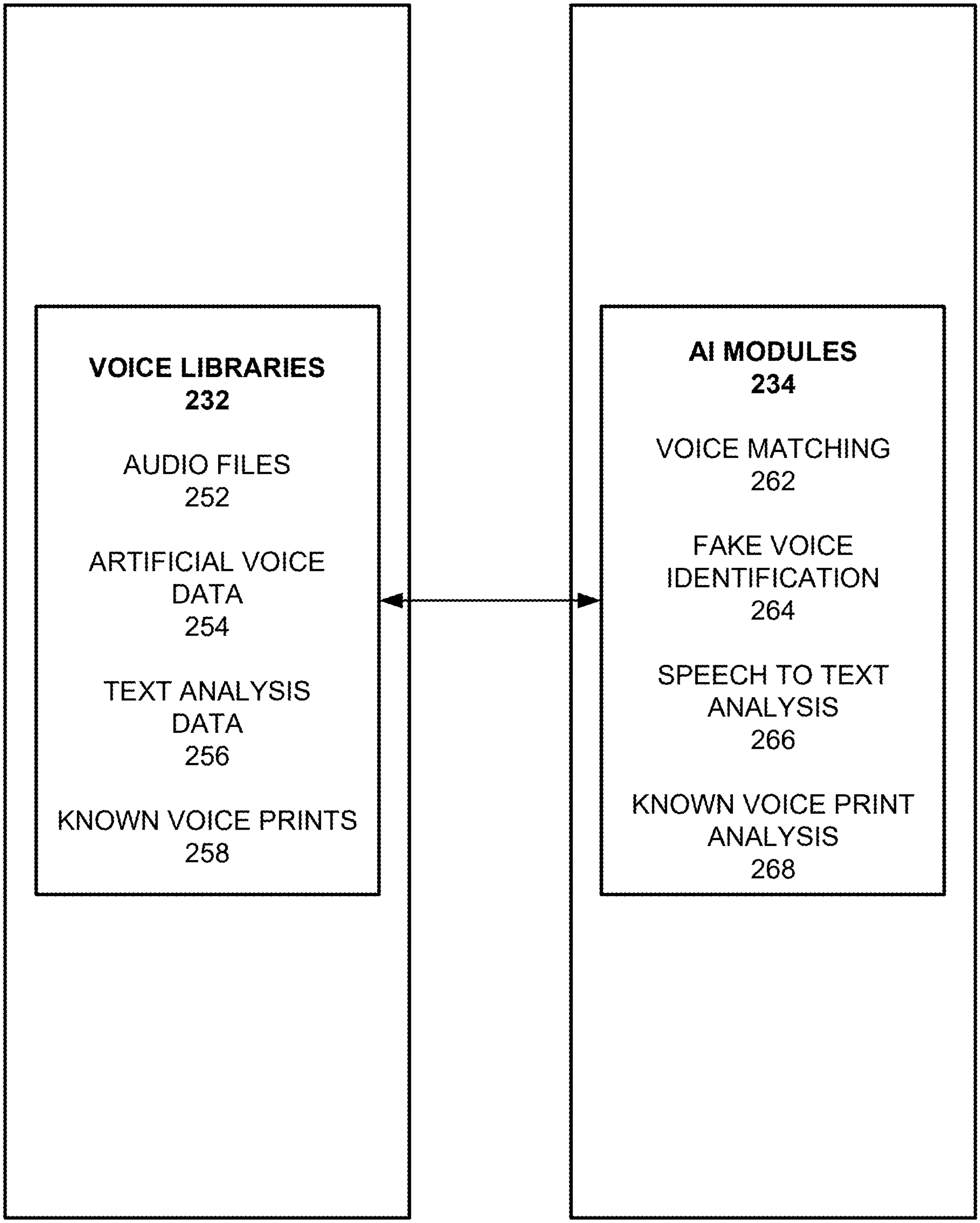
FIG. 2B illustrates a system configuration of specific operations of the artificial intelligence (AI) module associated with scam call detection according to example embodiments.

FIG. 2B illustrates a detailed example of the voice data libraries and the AI processing modules. Referring to FIG. 2B, the voice libraries 232 may include audio files of known audio segments which are considered scam. The audio from one or more of the arriving packets which are mirrored may be compared to the audio files to identify a match. Other content stored in memory may include artificial voice data 254, such as algorithms to detect synthetic speech audio vs. live real human speech. Text analysis data 256 may include a module which converts speech to text and uses libraries and word examining algorithms to detect word patterns associated with scams in the resulting text transcription. Another approach may include known voice prints 258 which may include well known scam voice samples of actual persons which are associated with scams.

The AI modules 234 may include a voice matching module 262 which compares the incoming audio of the call to known audio segments commonly used to defraud people via a telephone call. The fake voice identification module 264 will analyze the audio of the call to identify background noise and other audio information to identify whether the voice is synthesized and artificial which could yield a scam result by the module 234. The speech to text analysis module 266 will convert the received audio to text and use one or more speech/text algorithms to identify whether the words are based on a machine automated script or other non-authentic voice characteristics. The result of the text analysis may yield a result that identifies the audio of the call as a scam and whether to flag the content by sending a warning message. Any known voice that is common and which is an actual person's voice may be identified by the voice print analysis module 268. The common voice samples may be manipulated and modified, however, the voice characteristics can be identified and paired with a previous voice sample and the call with such voice characteristics can be flagged as potential scam.

Figure 3:
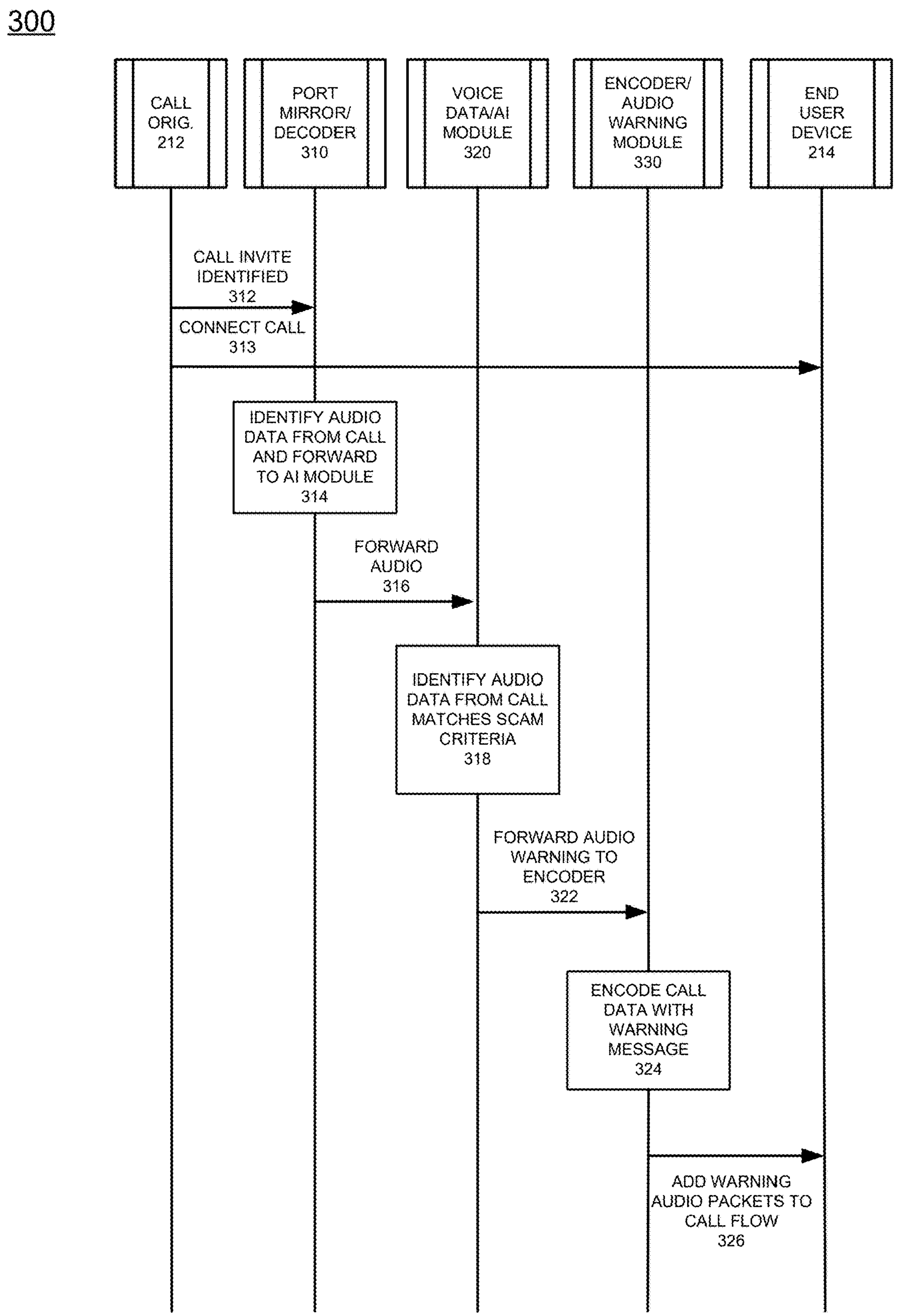
FIG. 3 illustrates a system diagram of an artificial intelligence call audio processing process according to example embodiments.

FIG. 3 illustrates a system diagram of an artificial intelligence (AI) call audio processing process according to example embodiments. Referring to FIG. 3, the example system configuration 300 includes a call being transmitted from a call originating device 212 and intended for an end user device 214. The call data may be examined by a data decoder 310 as the call message is identified 312. The call may be connected 313 without any delays while the audio data is being examined. The audio data may be examined 314 and forwarded 316 to a voice AI module 320 which may compare the audio to known (stored) audio data 318 to determine a likelihood of the call being a scam or other undesired type of call based on audio characteristics of the call being compared to known audio characteristics stored in memory and/or based on a data analysis, such as text analysis, non-human audio characteristics, modified audio characteristics, etc. The audio warning may be forwarded 322 to an encoder module 330 which encodes the audio data with a warning message 324, if necessary, to warn the user of the called device. The call warning data is then forwarded 326 and included with buffered call audio data, which may include a recorded message that the call is likely a scam or other audio information informing the called device about the identified audio data. As the call audio is playing, the warning message will interrupt the audio flow as those packets are processed by the audio buffer for the call.

Figure 4:
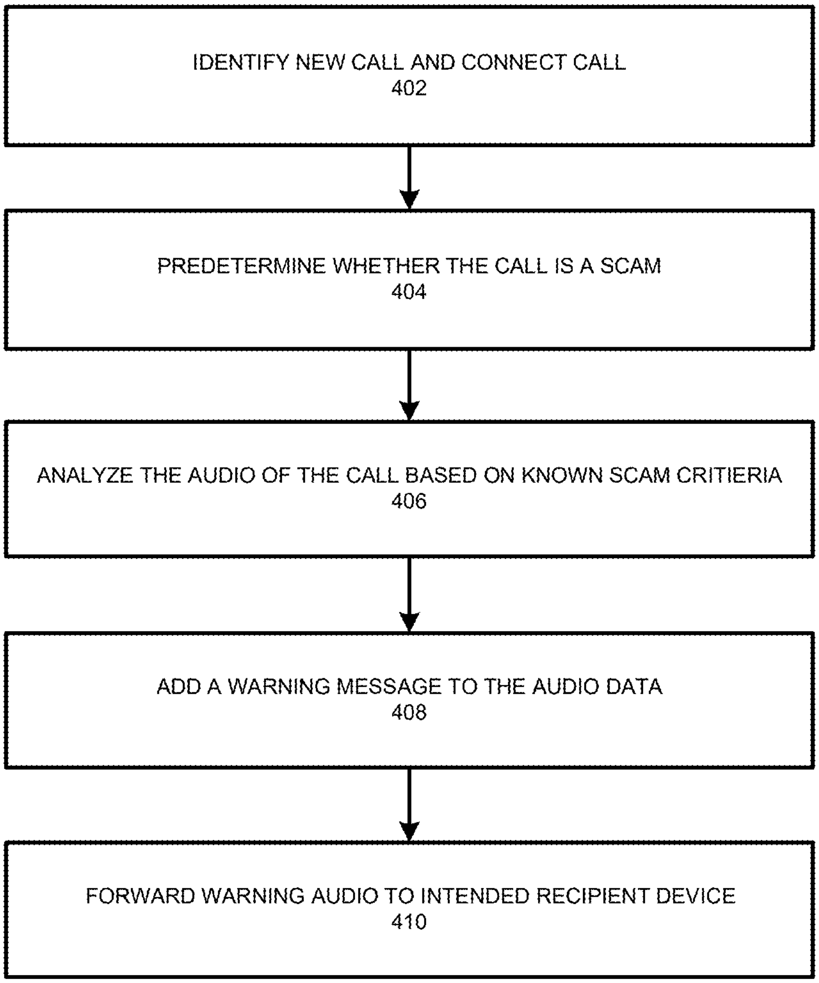
FIG. 4 illustrates a flow diagram of an artificial intelligence call audio processing process according to example embodiments.

FIG. 4 illustrates a flow diagram of an artificial intelligence call audio processing process according to example embodiments. Referring to FIG. 4, a new call is identified 402, and predetermination is made regarding whether the call is a scam 404. The audio is analyzed and compared to known audio data 406. A warning message is added 408 to one or more audio packets. The call warning message is forwarded to the end user device during the live call 410.

One example may include receiving a call invite message associated with a call intended for a call device and connecting the call. The process may also include identifying one or more audio portions of the call, creating one or more audio packets to include a warning audio message, and forwarding the created one or more audio packets to the intended call device.

The process may also include connecting the call to the call device, and the forwarding the one or more audio packets to the intended call device is performed during the call, and interrupting audio associated with the call with audio associated with the created one or more audio packets. The process may also include establishing a port mirror to mirror call packets associated with the call at an IP network device, and forwarding the mirrored call packets to an artificial intelligence audio detection module to perform an audio analysis of the audio associated with the mirrored call packets.

The creation of one or more audio packets may include the origination of spoofed packets based on the information received from the RTP packets being analyzed. The process may also include comparing the one or more audio portions of the call to one or more stored audio files and when a match occurs, designating the call a scam call.

The process may also include converting the one or more audio portions of the call to a text, analyzing the text to identify the text is not associated with audio of a genuine person, and designating the call a scam call. The audio message may be overplayed on the one or more audio portions of the call.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 5:
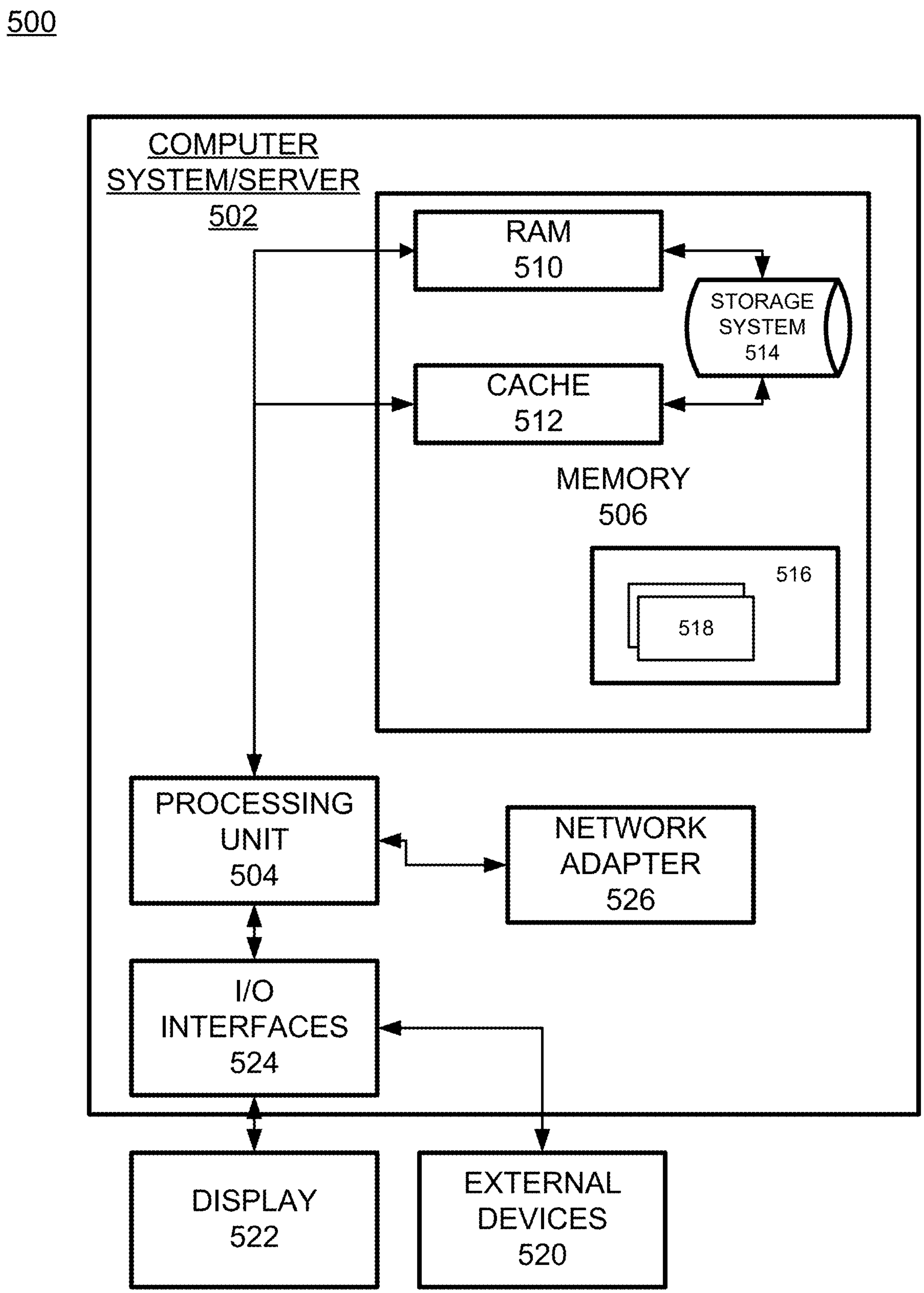
FIG. 5 illustrates an example network entity device configured to store instructions, software, and corresponding hardware for executing the same according to example embodiments.

FIG. 5 is not intended to suggest any limitation as to the scope of use or functionality of embodiments of the application described herein. Regardless, the computing node 500 is capable of being implemented and/or performing any of the functionality set forth hereinabove.

In computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, rich clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As displayed in FIG. 5, computer system/server 502 in cloud computing node 500 is displayed in the form of a general-purpose computing device. The components of computer system/server 502 may include, but are not limited to, one or more processors or processing units 504, a system memory 506, and a bus that couples various system components including system memory 506 to processor 504.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media. System memory 506, in one embodiment, implements the flow diagrams of the other figures. The system memory 506 can include computer system readable media in the form of volatile memory, such as random-access memory (RAM) 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not displayed and typically called a "hard drive"). Although not displayed, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 506 may include at least one program product having a set (e.g., at least one) of program modules that are configured to carry out the functions of various embodiments of the application.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 502 may also communicate with one or more external devices 520 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524. Still yet, computer system/server 502 can communicate with one or more networks such as a local area network (LAN), a general wide area network (WAN), and/or a public network (e.g., the Internet) via network adapter 526. As depicted, network adapter 526 communicates with the other components of computer system/server 502 via a bus. It should be understood that although not displayed, other hardware and/or software components could be used in conjunction with computer system/server 502. Examples include, but are not limited to: microcode, device drivers, redundant processing units, external disk drive arrays, RAID systems, tape drives, and data archival storage systems, etc.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:

receiving a call invite message associated with a call intended for a call device, wherein the call comprises a stream of data packets;

identifying the call as an undesired type of call based on an analysis of an audio portion of the call;

creating an audio packet that includes an audio message about the undesired type of call; and injecting the audio packet into the stream of data packets, so that the audio packet is sent to the call device.

2. The method of claim 1, comprising:

connecting the call to the call device, wherein the injecting of the audio packet is performed after the call is connected; and interrupting audio associated with the call with audio associated with the audio packet.

3. The method of claim 1, comprising:

establishing a port mirror to mirror call packets associated with the call to create mirrored call packets; and forwarding the mirrored call packets to an artificial intelligence audio detection module to perform an audio analysis of the audio portion associated with the mirrored call packets.

4. The method of claim 3, wherein the creating of the audio packet comprises:

modifying a sequence number of the audio packet to be higher than a sequence number associated with the mirrored call packets, such that the call device identifies the audio packet as a next audio packet to be received and played.

5. The method of claim 1, wherein the identifying of the call as the undesired type of call comprises:

comparing the audio portion to a stored audio file; and in response to a match, designating the call as the undesired type.

6. The method of claim 1, wherein the identifying of the call as the undesired type of call comprises:

converting the audio portion into text;

identifying that the audio portion is not from an actual person based on the analysis of the text; and in response to the audio portion not being from the actual person, designating the call as the undesired type.

7. The method of claim 1, wherein the audio message is played over the audio portion.

8. An apparatus comprising:

a receiver configured to receive a call invite message associated with a call intended for a call device, wherein the call comprises a stream of data packets;

a processor configured to:

identify the call as an undesired type of call based on an analysis of an audio portion of the call;

create an audio packet that includes an audio message about the undesired type of call; and inject the audio packet into the stream of data packets, so that the audio packet is sent to the call device.

9. The apparatus of claim 8, wherein the processor is configured to:

connect the call to the call device, wherein the injecting of the audio packet is performed after the call is connected; and interrupt audio associated with the call with audio associated with the audio packet.

10. The apparatus of claim 8, wherein the processor is configured to:

establish a port mirror to mirror call packets associated with the call to create mirrored call packets; and forward the mirrored call packets to an artificial intelligence audio detection module to perform an audio analysis of the audio portion associated with the mirrored call packets.

11. The apparatus of claim 10, wherein, when the processor creates the audio packet, the processor is configured to:

modify a sequence number of the audio packet to be higher than a sequence number associated with the mirrored call packets, such that the call device identifies the audio packet as a next audio packet to be received and played.

12. The apparatus of claim 8, wherein, when the processor identifies the call as the undesired type of call, the processor is configured to:

compare the audio portion to a stored audio file; and in response to a match, designate the call as the undesired type.

13. The apparatus of claim 8, wherein, when the processor identifies the call as the undesired type of call, the processor is configured to:

convert the audio portion into text;

identify that the audio portion is not from an actual person based on the analysis of the text; and in response to the audio portion not being from the actual person, designate the call as the undesired type.

14. The apparatus of claim 8, wherein the audio message is played over the audio portion.

15. A non-transitory computer-readable medium comprising instructions that, when executed by a processor, cause the processor to perform:

receiving a call invite message associated with a call intended for a call device, wherein the call comprises a stream of data packets;

identifying the call as an undesired type of call based on an analysis of an audio portion of the call;

creating an audio packet that includes an audio message about the undesired type of call; and injecting the audio packet into the stream of data packets, so that the audio packet is sent to the call device.

16. The non-transitory transitory computer-readable medium of claim 15, wherein the instructions cause the processor to perform:

connecting the call to the call device, wherein the injecting of the audio packet is performed after the call is connected; and interrupting audio associated with the call with audio associated with the audio packet.

17. The non-transitory transitory computer-readable medium of claim 15, wherein the instructions cause the processor to perform:

establishing a port mirror to mirror call packets associated with the call to create mirrored call packets; and forwarding the mirrored call packets to an artificial intelligence audio detection module to perform an audio analysis of the audio portion associated with the mirrored call packets.

18. The non-transitory transitory computer-readable medium of claim 17, wherein the creating of the audio packet comprises:

modifying a sequence number of the audio packet to be higher than a sequence number associated with the mirrored call packets, such that the call device identifies the audio packet as a next audio packet to be received and played.

19. The non-transitory transitory computer-readable medium of claim 15, wherein the identifying of the call as the undesired type of call comprises:

comparing the audio portion to a stored audio file; and in response to a match, designating the call as the undesired type.

20. The non-transitory transitory computer-readable medium of claim 15, wherein the identifying of the call as the undesired type of call comprises:

converting the audio portion into text;

identifying that the audio portion is not from an actual person based on the analysis of the text; and in response to the audio portion not being from the actual person, designating the call as the undesired type.

* * * * *